United States Patent Office.

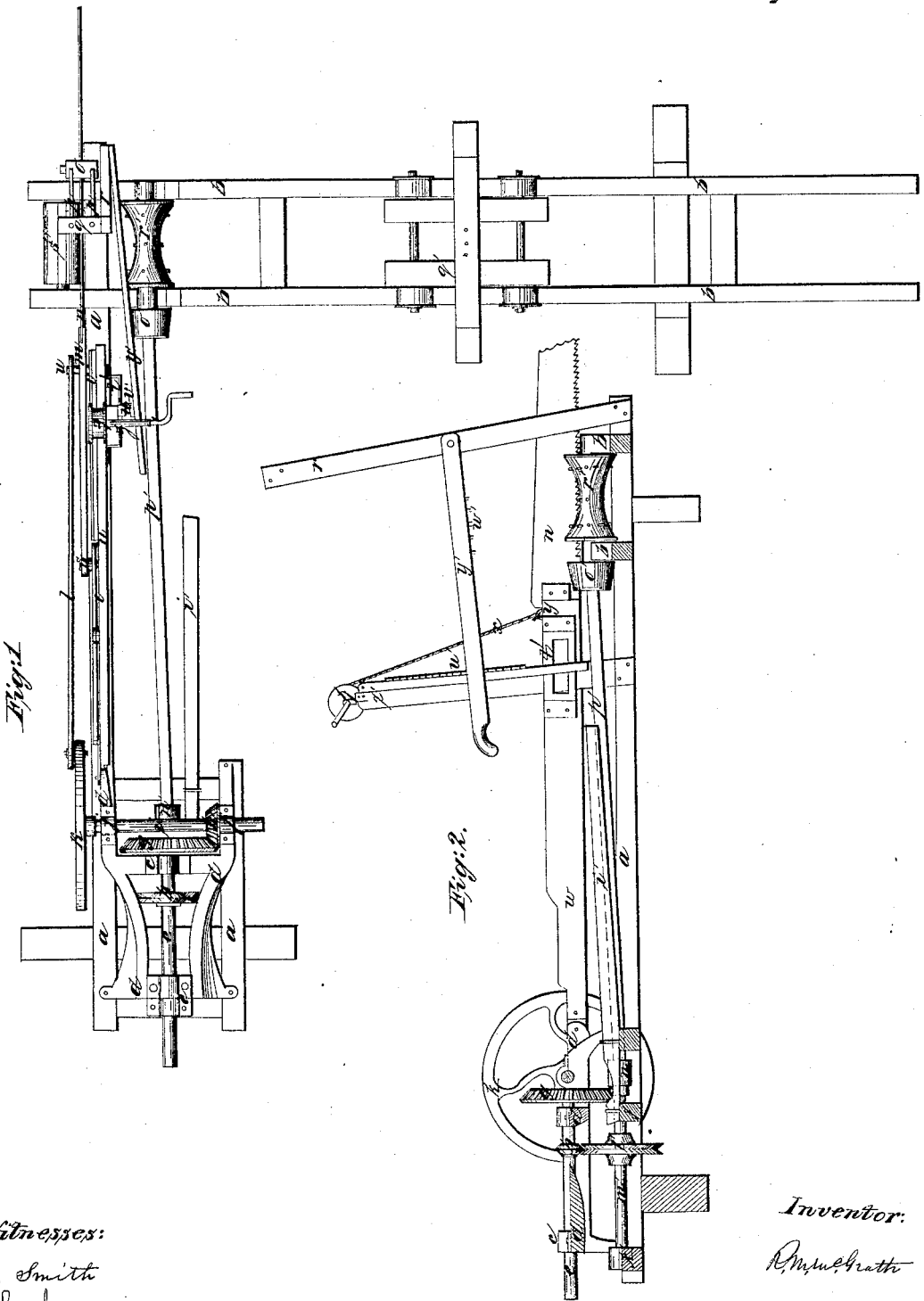

R. M. McGRATH, OF LAFAYETTE, INDIANA, ASSIGNOR TO HIMSELF AND J. H. GALLAGHER.

*Letters Patent No. 65,251, dated May 28, 1867.*

---

IMPROVEMENT IN SAWING MACHINES.

---

The Schedule referred to in these Letters Patent and making part of the same.

---

TO ALL WHOM IT MAY CONCERN:

Be it known that I, R. M. McGRATH, of Lafayette, in the State of Indiana, have invented a certain new and useful improvement on Sawing Machines; and I do hereby declare that the following is a full, clear, and exact description of the construction and operation of the same, reference being had to the accompanying drawings, and to the letters and marks thereon, which said drawings form part of this specification, and, by Figure 1, represent a machine having my improvement as a part thereof, said figure being a top view of the machine; and, by Figure 2, the main part of the machine, said fig. 2 being a view by longitudinal section.

In both of these figures, where like parts are shown, like marks and letters are used to indicate the parts.

Upon suitable frame-bars, $a$, are affixed the saw and the means for operating it; and upon another like set of bars, $b$, and at right angles to the first named, are placed the means for feeding a log or piece of timber up to the saw. At one end of the frame-bars $a$, and resting in bearings $c$, properly secured to the bars $d$, is the main or power-shaft $e$, to which can be connected a horse-power, or any other motive power, to drive the machine. This shaft $e$ has upon it a friction-wheel, $f$, and a bevelled toothed wheel, $g$. The bevelled wheel $g$ gives rotation to a bevelled pinion, $h$, on a cross-shaft, $i$, which cross-shaft has its bearings $j$ on the bars $d$. A fly-wheel or balance-wheel, $k$, is affixed to the end of the shaft $i$, to which one end of the pitman $l$ is connected, the other end of the pitman being attached to the bar $m$ of the saw. The inner end of the saw $n$ is firmly secured in the bar $m$, while the outer end is embraced by a guide-block, $o$, which can traverse up or down on the rods $p$, that are attached at the top to suitable parts of the frame-bars by the piece $q$ and upright $r$, and at the bottom to the main-frame bar, or to the lower end of the upright, by a like piece. The bar $m$ has at its one end a nut and pin, $s$, the pin fitting into a slot in the bar $t$, in which slot the pin traverses as the saw is moved backward and forward. The pivot $u$ of the pitman also traverses in a slot in the guide-bar $v$, these bars $t$ and $v$ being attached to the bar $w$, which is connected to an extension of the bar $d$, so that the bar $w$, being here pivoted, may have its outer end raised or lowered, carrying with it the saw, and the other pieces herein named as being attached to it. The raising of the saw and its attachments is effected by a cord or chain, $x$, attached to the bar $w$ at $y$, and to the pulley $z$, whose shaft has its bearings in a head, $z'$, on an upright, $x'$, while the lowering of the saw and the parts named is produced by the weights thereof, the pulley being allowed play. The guide-block $o$ embraces the saw at all times, so that the saw is steadied and guided thereby; and thus the saw can be moved with greater rapidity than it could be if the guide rested upon the log or was in action only during a part of the movements of the saw. The bar $r$ is so attached to the frame-bar $a$ as to have a certain amount of play. A lever, $y'$, affixed to it allows the operator to move the bar $r$ and the guide-block; and the lever $y'$, having teeth on its under side, marked $w'$, and a plate, $v'$, at its inner end, which plate fits into a toothed or serrated plate, $u'$, on the upright $x'$, enables the operator to steady the bar $r$ and guide-block $o$ as the teeth $w'$ may be pressed into the log or the stick of timber, and the lever be held firmly by the plate $v'$ fitting into or under one of the teeth of the plate $u'$. A plate, $t'$, embracing the bar or upright $x'$, and attached to the bar $w$, serves to guide the bar $w$ and its attachments in its upward and downward movements.

In being sawed the log or timber will lie upon the roller $s'$, the toothed wheel $r'$, and the carriage $q'$, the feeding forward of it being produced by the shaft $p'$, fitting into the hub $o'$ of the wheel $r'$, and into the coupling-box or hub $n'$ of the shaft $m'$, which shaft derives its motion from its friction-roller $l'$, fitting into the friction-roller $f$ on the main shaft $e$. The outer bearing of the shaft $m'$ is upon the cross-piece $k'$ of the frame. The inner bearing is upon the cross-piece $j'$, which has its ends so fitted into the frame-bars $a$ as to have some play, by which the end of the shaft $m'$ may be raised or lowered by the action of the lever $i'$, and thus the friction-wheel $l'$ be brought into connection with the friction-wheel $f$ whenever the log is to be moved forward.

From this recital of the construction and operation of this machine it will readily be seen that it is intended for cross-sawing of logs or timber, and is of that class of machines wherein certain parts are detachable or separable from each other, so that the machine may easily be carried from one point or location to another, as may be required, horse-power generally being the motive power used to operate it. In using this machine the operator, by standing near the upright $x'$, can control the lever $y'$ with his left hand, the pulley $z$ and cord $x$ with his right hand, and the lever $i'$ with his left foot, so that the operation of the machine can be conveniently regulated and managed by him.

What I claim as my invention, and desire to secure by Letters Patent, is—

I claim the arrangement of the lever $y'$, pulley $z$, and its cord $x$, and the lever $i'$, for placing within the control of the operator the management of the sawing and feeding devices of the machine.

This specification signed this 31st day of August, 1866.

R. M. McGRATH.

Witnesses:
    CHESTER E. TUTTLE,
    HERMANN KESSTEN.